United States Patent
Motokawa et al.

(10) Patent No.: US 11,239,524 B2
(45) Date of Patent: Feb. 1, 2022

(54) CELL MODULE

(71) Applicant: Panasonic Intellectual Property Management Co., Ltd., Osaka (JP)

(72) Inventors: Shinya Motokawa, Hyogo (JP); Shingo Kume, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 23 days.

(21) Appl. No.: 16/638,610

(22) PCT Filed: Dec. 19, 2018

(86) PCT No.: PCT/JP2018/046681
§ 371 (c)(1),
(2) Date: Feb. 12, 2020

(87) PCT Pub. No.: WO2019/131359
PCT Pub. Date: Jul. 4, 2019

(65) Prior Publication Data
US 2020/0251701 A1    Aug. 6, 2020

(30) Foreign Application Priority Data
Dec. 26, 2017  (JP) .............................. JP2017-249816

(51) Int. Cl.
*H01M 50/20*  (2021.01)
*H01M 50/50*  (2021.01)
(Continued)

(52) U.S. Cl.
CPC ....... *H01M 50/20* (2021.01); *H01M 10/0413* (2013.01); *H01M 10/0422* (2013.01);
(Continued)

(58) Field of Classification Search
CPC .... H01M 50/20; H01M 50/50; H01M 50/147; H01M 10/0413; H01M 10/0431
See application file for complete search history.

(56) References Cited

U.S. PATENT DOCUMENTS

| | | | | |
|---|---|---|---|---|
| 3,794,525 A | * | 2/1974 | Kaye | ..................... H01M 50/20 |
| | | | | 429/9 |
| 6,613,473 B1 | * | 9/2003 | Tong | ................... H01M 50/213 |
| | | | | 429/154 |
| 2014/0255748 A1 | * | 9/2014 | Jan | ....................... H01M 10/04 |
| | | | | 429/120 |

FOREIGN PATENT DOCUMENTS

JP      2009-252351      10/2009

OTHER PUBLICATIONS

Machine Translation of: JP 2009/252351 A, Uchida et al., Oct. 29, 2009.*

(Continued)

*Primary Examiner* — Kenneth J Douyette
(74) *Attorney, Agent, or Firm* — McDermott Will & Emery LLP

(57) ABSTRACT

A cell module includes: a battery cell group configured with a plurality of cylindrical battery cells; a positive current collector; and a negative current collector. The negative current collector has: a substrate disposed on a sealing body side of the cylindrical battery cells such that the negative current collector covers the battery cell group; and a current collecting pin protruding toward the battery cell group from the substrate. The current collecting pin is inserted into a gap between the cylindrical battery cells along an axial direction of such battery cells, and presses the side surfaces of outer cans of at least two cylindrical battery cells neighboring each other.

5 Claims, 7 Drawing Sheets

(51) Int. Cl.
*H01M 50/147* (2021.01)
*H01M 10/04* (2006.01)
*H01M 10/0587* (2010.01)

(52) U.S. Cl.
CPC ... *H01M 10/0431* (2013.01); *H01M 10/0587* (2013.01); *H01M 50/147* (2021.01); *H01M 50/50* (2021.01)

(56) References Cited

OTHER PUBLICATIONS

International Search Report of PCT application No. PCT/JP2018/046681 dated Mar. 26, 2019.

\* cited by examiner

CELL MODULE

CROSS-REFERENCE TO RELATED APPLICATIONS

This application is a U.S. national stage application of the PCT International Application No. PCT/JP2018/046681 filed on Dec. 19, 2018, which claims the benefit of foreign priority of Japanese patent application 2017-249816 filed on Dec. 26, 2017, the contents all of which are incorporated herein by reference.

TECHNICAL FIELD

The present disclosure relates to a cell module.

BACKGROUND ART

A conventionally known cell module includes a plurality of cylindrical battery cells disposed while sealing bodies of the battery cells are directed to the same direction. To the cell module, various current collectors and inter-cell connection structures are applied to parallel connect or series connect the battery cells. For example, PTL 1 discloses an inter-cell connection structure in which a connection plate bracket welded on a side surface of an outer can, functioning as an outer terminal, of each battery cell is used to series connect the battery cells. Further, in another known connection structure, a current collector is welded on a shoulder of each outer can.

CITATION LIST

Patent Literature

PTL 1: Unexamined Japanese Patent Publication No. 2009-252351

SUMMARY OF THE INVENTION

Regarding cell modules, an inter-cell connection structure is required in which battery cells can be easily connected to each other and good electrical connection between the battery cells can be secured. It is considered that good electrical connection between battery cells can be achieved with the connection structure disclosed in PTL 1, but it is necessary to weld a connection plate bracket on a side surface of each outer can, and there is a room for improvement of productivity (easiness of connection). Further, there is an issue that, in a case of a connection structure in which a current collector is welded on a shoulder of each outer can, dimension constraint is so strict that the welding will be difficult.

A cell module as an aspect of the present disclosure is characterized in the following configuration. A cell module includes a battery cell group including a plurality of cylindrical battery cells, where each of the cylindrical battery cells includes: an outer can that has a bottomed cylindrical shape and contains an electricity-generation element; and a sealing body that seals an opening of the outer can. The cylindrical battery cells are disposed with the sealing bodies directed in the same direction. The cell module includes: a first current collector electrically connected to each of the sealing bodies functioning as first outer terminals of the plurality of cylindrical battery cells, and a second current collector electrically connected to each of the outer cans functioning as second outer terminals of the plurality of cylindrical battery cells. The second current collector has: a substrate disposed on the sealing bodies side to cover the battery cell group; and at least one current collecting pin protruding in a direction toward the battery cell group from the substrate. The at least one current collecting pin is inserted into a gap between the cylindrical battery cells in an axial direction of the battery cells and presses side surfaces of the outer cans of at least two cylindrical battery cells, of the cylindrical battery cells, neighboring each other.

An aspect of the present disclosure can provide, in a cell module including a plurality of cylindrical battery cells, an inter-cell connection structure in which it is easy to connect between the battery cells, and in addition, good electrical connection between the battery cells can be secured. A cell module as an aspect of the present disclosure improves productivity and secures good electrical connection between battery cells, for example.

DESCRIPTION OF EMBODIMENT

Figure 1:
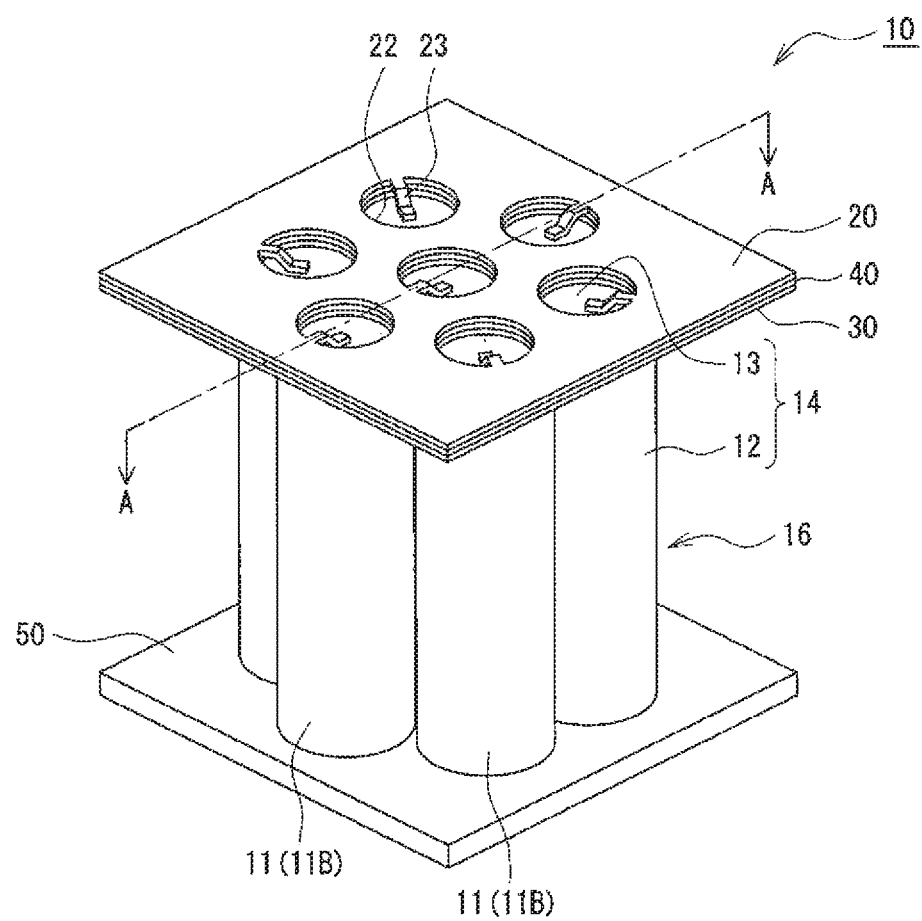
FIG. 1 is a perspective view of a cell module as an example of an exemplary embodiment.

In the following, an example of an exemplary embodiment of the present disclosure will be described in detail. However, a cell module according to the present disclosure is not limited to the exemplary embodiment described below. Because the drawings referred to in the description of the exemplary embodiment are schematically drawn, and dimensions and proportions of the components illustrated in the drawings should be understood in consideration of the following description. The description "substantially blah-blah-blah" in the present specification intended to mean, in a case of "substantially parallel", both of a state of being perfectly parallel and a state of being considered virtually parallel. In the following, for the sake of convenience of description, a direction along an axial direction of a cylindrical battery cell is assumed as "vertical direction", and a sealing body side of a battery cell is assumed as "upper".

Figure 2:
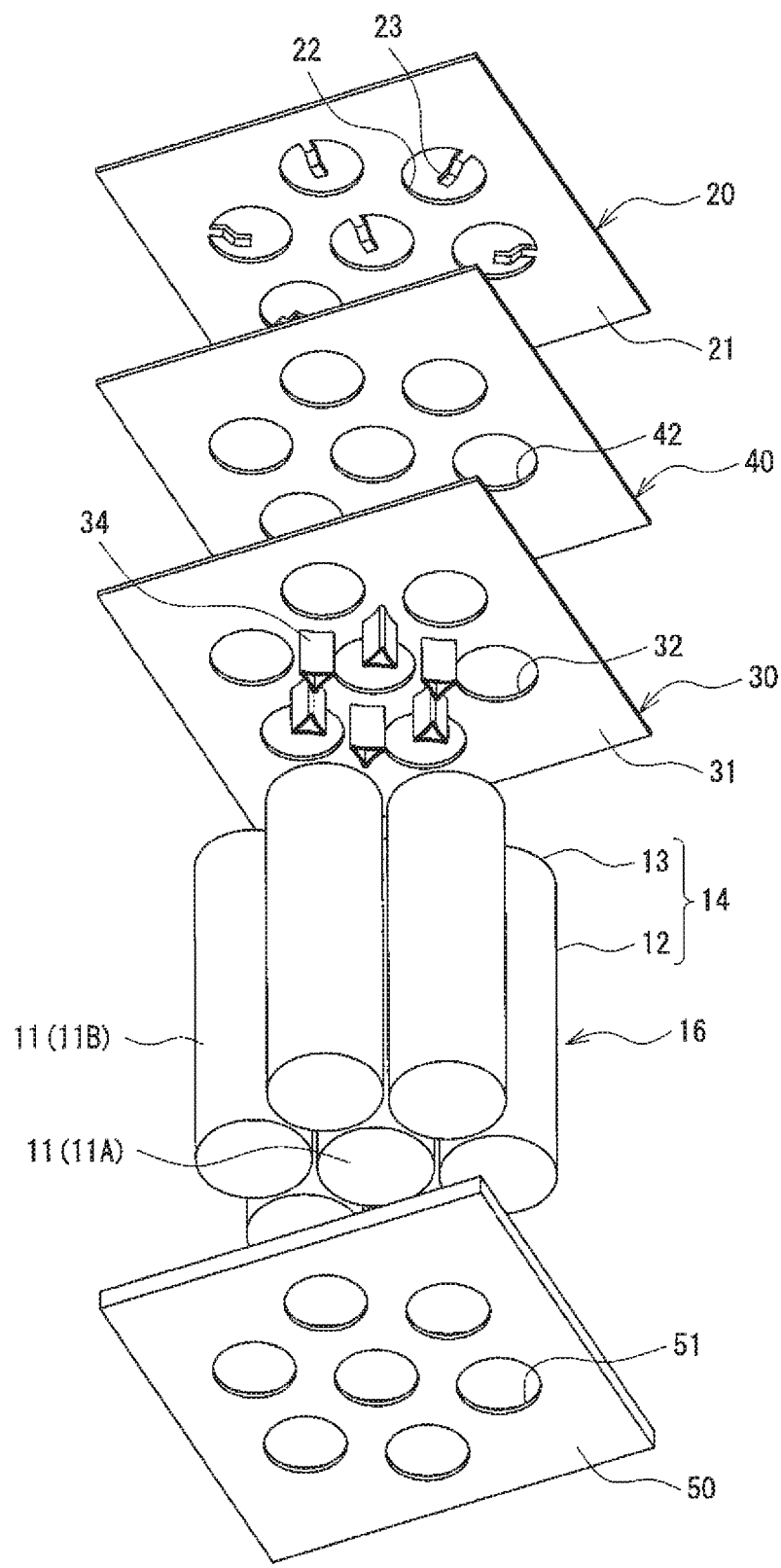
FIG. 2 is an exploded perspective view of the cell module as an example of the exemplary embodiment.

FIG. 1 is a perspective view of cell module 10 as an example of the exemplary embodiment. FIG. 2 is an exploded perspective view of cell module 10. As shown in FIGS. 1 and 2, cell module 10 includes battery cell group 16 configured with a plurality of cylindrical battery cells 11. In cell module 10, cylindrical battery cells 11 constituting battery cell group 16 are connected in parallel. Each cylindrical battery cell 11 has: outer can (=outer jacket) 12 that contains an electricity-generation element and has a bottomed cylindrical shape; and sealing body 13 that seals an opening of outer can 12. Cylindrical battery cells 11 are disposed such that sealing bodies 13 are directed in the same direction and such that axial directions of individual cylindrical battery cells 11 are substantially parallel.

Cell module 10 includes: positive current collector 20 electrically connected to each of sealing bodies 13 functioning as first outer terminals of cylindrical battery cells 11; and a negative current collector 30 electrically connected to each of outer cans 12 functioning as second outer terminals of cylindrical battery cells 11. In addition, cell module 10 includes insulating plate 40 located between positive current collector 20 and negative current collector 30. In the present exemplary embodiment, the description is given assuming that the first outer terminals are positive outer terminals and that the second outer terminals are negative outer terminals; however, the first outer terminals may be negative outer terminals, and the second outer terminal may be positive outer terminals.

Cell module 10 may include battery cell holder 50 to hold cylindrical battery cells 11. Battery cell holder 50 has housing parts 51 in which respective cylindrical battery cell 11 are housed. Housing parts 51 each may be a through hole through which cylindrical battery cell 11 can be inserted, or may be a recessed portion into which cylindrical battery cell 11 can be inserted. Battery cell holder 50 fixes arrangement of cylindrical battery cells 11 to maintain a shape of battery cell group 16. In the present exemplary embodiment, the current collectors are attached to an upper end part of battery cell group 16, and battery cell holder 50 is attached to a lower end part of battery cell group 16. That is, cell module 10 has a structure in which battery cell group 16 is sandwiched from above and below by the current collectors and battery cell holder 50.

Battery cell holder 50 illustrated in FIGS. 1 and 2 is a panel-shaped member to hold only lower end parts of cylindrical battery cells 11; however, a shape of the battery cell holder is not particularly limited this example. The battery cell holder may be, for example, a block-shaped member by which the battery cells are held from the lower end parts to the vicinities of the upper end parts of cylindrical battery cells 11. Further, battery cell holder 50 may be made of a resin material or a metallic material such as aluminum. Battery cell holder 50 made of metal functions also as a heat dissipation member of heat of cylindrical battery cells 11. However, if metal battery cell holder 50 is used, it is preferable to provide an insulator such as an insulation film or the like to prevent electrical connection between outer cans 12 and the battery cell holder 50.

Note that it is possible to introduce a cooling medium in battery cell holder 50 to add a function as a cooler, and it is also possible to separately provide a cooler such as a cooling pipe or a cooling plate in the gaps between cylindrical battery cells 11, under battery cell group 16, or in other places. In cell module 10, the current collectors are attached to only the upper end parts of cylindrical battery cells 11; therefore, for example, under battery cell group 16 or in the gaps between cylindrical battery cells 11, it is possible to secure a space in which a cooler can be attached or cooling air can be made to flow.

Each cylindrical battery cell 11 has battery cell case 14 configured with outer can 12 and sealing body 13. Outer can 12 is a metal container having a bottomed cylindrical shape, and functions as the negative outer terminal. Outer can 12 contains an electrode body having, for example, a wound structure and an electricity-generation element including a non-aqueous electrolyte. Sealing body 13 is a circular disc-shaped member made of metal to seal an opening of outer can 12 and functions as a positive outer terminal. Sealing body 13 has a safety valve that is released when an internal pressure is raised due to, for example, abnormal heat generation in the battery cell. Between outer can 12 and sealing body 13, insulator 15 such as a gasket is provided to prevent electrical connection between outer can 12 and sealing body 13.

In the present exemplary embodiment, outer can 12 constitutes: an upper end corner part (shoulder) of battery cell case 14; and a peripheral edge part of an upper surface of battery cell case 14, on which sealing body 13 is provided. On a part of the upper surface of battery cell case 14 except the peripheral edge part, an opening of outer can 12 is formed, and sealing body 13 is provided through insulator 15 to seal the opening.

Battery cell group 16 is an assembly of cylindrical battery cells 11, which are a plurality of single battery cells, and is configured by disposing the battery cells in such a manner that sealing bodies 13 are aligned to face in the same direction and axial directions of the battery cells are substantially parallel to each other. Further, upper surfaces and lower surfaces of cylindrical battery cells 11 are each preferably located on substantially the same plane. In the present exemplary embodiment, seven cylindrical battery cells 11 constitute battery cell group 16. The plurality of cylindrical battery cells 11 include one first battery cell 11A and six second battery cells 11B arranged around first battery cell 11A. Here, first battery cell 11A just represents a battery cell surrounded by cylindrical battery cells 11 (second battery cells 11B). In general, the same type of battery cell is used for each of cylindrical battery cells 11 (first battery cell 11A and second battery cells 11B).

As shown in FIG. 2, the plurality of second battery cells 11B are arranged on the same circumference in a surrounding area of first battery cell 11A. In more detail, second battery cells 11B are disposed such that a central axis of each second battery cell 11B is located substantially on the same circumference centering the central axis of first battery cell 11A. Second battery cells 11B are arranged around first battery cell 11A such that there are substantially constant gaps between first battery cell 11A and second battery cells 11B and that there are substantially constant gaps between second battery cells 11B.

Note that the number or arrangement of cylindrical battery cells 11 constituting battery cell group 16 are not particularly limited. For example, there may be a plurality of first battery cells 11A, which are surrounded by other cylindrical battery cells 11, or the battery cell group may be constituted by eight or more cylindrical battery cells 11 arranged in a staggered manner.

As described above, cell module 10 includes positive current collector 20 and negative current collector 30 disposed on battery cell group 16 and insulating plate 40 disposed between the current collectors. Positive current collector 20 is stacked on a surface (upper surface) of negative current collector 30 opposite to battery cell group 16 with insulating plate 40 disposed between positive current collector 20 and negative current collector 30. That is, the current collectors of cell module 10 has a stacked structure in which negative current collector 30, insulating plate 40, and positive current collector 20 are stacked in order from a battery cell group 16 side. Positive current collector 20, negative current collector 30, and insulating plate 40 may be bonded to each other with an adhesive or the like. Note that positive current collector 20 can be disposed on the battery cell group 16 side with respect to negative current collector 30.

Positive current collector 20 has substrate 21 disposed on a sealing body 13 side of positive current collector 20 to cover battery cell group 16. Substrate 21 is, for example, a plate-shaped member made of metal and has a plurality of opening parts 22 through each of which sealing body 13 of each cylindrical battery cell 11 is exposed. It is thought that, if an internal pressure increases due to abnormal heat generation in cylindrical battery cell 11, a gas blows out breaking sealing body 13 or safety valve of sealing body 13; and opening part 22 is provided in substrate 21 to secure a blow path for the gas. Opening parts 22 are formed at positions at each of which each opening part 22 vertically overlaps sealing body 13 of each cylindrical battery cell 11. Opening parts 22 have a larger diameter than, for example, sealing bodies 13.

Positive current collector 20 has lead parts 23 each extending toward a center of each opening part 22 from an edge part of opening part 22. One lead part 23 is provided on the edge part of each opening part 22, for example. Each lead part 23 is connected to sealing body 13 of each cylindrical battery cell 11, which sealing body 13 functions as the positive outer terminal, through opening part 42 of insulating plate 40 and opening part 32 of negative current collector 30. On substrate 21 electrically connected to cylindrical battery cells 11 through the plurality of lead parts 23, a conductive member (not shown) is attached and is connected to a power source, a load, or the like (the same thing goes for negative current collector 30).

Negative current collector 30 has: substrate 31 disposed on the sealing bodies 13 side to cover battery cell group 16; and at least one current collecting pin 34 disposed to protrude toward battery cell group 16 from substrate 31. Details will be described later, but each current collecting pin 34 is electrically connected to a side surface of each outer can 12 functioning as the negative outer terminal. Substrate 31 is a plate-shaped member made of metal in the same way as substrate 21 and has a plurality of opening parts 32 through each of which sealing body 13 of each cylindrical battery cell 11 is exposed. Opening parts 32 are formed at positions at each of which each opening part 32 vertically overlaps sealing body 13 of each cylindrical battery cell 11 and each opening part 22 of positive current collector 20. Opening parts 32 have a larger diameter than, for example, sealing bodies 13 and have approximately the same diameter as opening parts 22.

Insulating plate 40 has a function to prevent electrical connection between positive current collector 20 and negative current collector 30. Insulating plate 40 is made of, for example, resin and has a plurality of opening parts 42 through each of which sealing body 13 of each cylindrical battery cell 11 is exposed. Opening parts 42 are formed at positions at each of which each opening part 42 vertically overlaps sealing body 13 of each cylindrical battery cell 11, each opening part 22 of positive current collector 20, and each opening part 32 of negative current collector 30. Opening parts 32 have approximately the same diameter as opening parts 22 and 32, for example.

Hereinafter, with reference to FIGS. 2 to 5, a description will be given on negative current collector 30 and an inter-cell connection structure using negative current collector 30.

Negative current collector 30 is disposed on battery cell group 16 such that substrate 31 covers battery cell group 16. However, negative current collector 30 is disposed with opening parts 32 vertically overlapping sealing bodies 13 such that sealing bodies 13 are exposed through opening parts 32. In the present exemplary embodiment, substrate 31 is in contact with the peripheral edge parts of the upper surfaces, of battery cell cases 14, constituted by outer cans 12. Further, on an upper surface of substrate 31, insulating plate 40 and positive current collector 20 are stacked in this order. Positive current collector 20 parallel connects positive electrodes of the battery cells such that, for example, each lead part 23 is welded to sealing body 13 of each cylindrical battery cell 11.

As described above, negative current collector 30 has current collecting pins 34 protruding toward battery cell group 16 from substrate 31. Negative current collector 30 parallel connects negative electrodes of the battery cells to each other by using current collecting pins 34. Each current collecting pin 34 is inserted into the gap between cylindrical battery cells 11 along the axial direction of the battery cells and presses the side surfaces of outer cans 12 of at least two cylindrical battery cells 11 neighboring each other. Since current collecting pin 34 is in strong contact with the side surface of outer can 12, good electrical connection between negative current collector 30 and outer can 12 as the negative outer terminal is secured.

By using negative current collector 30, it is possible to connect between the battery cells in a simple manner that current collecting pins 34 are inserted into the gaps between cylindrical battery cells 11. By using current collecting pins 34, it is not necessary to weld current collectors to the side surfaces of outer cans 12; therefore, productivity is improved, and at the same time, the gaps between cylindrical battery cells 11 can be small. When the gap can be small, a volume energy density of cell module 10 can be increased.

As illustrated in FIG. 2, the plurality (six) of current collecting pins 34 are provided in a standing manner on a lower surface of substrate 31. The number of current collecting pins 34 is, for example, smaller by one than the number of cylindrical battery cells 11 constituting battery cell group 16. Each current collecting pin 34 has such a length that at least an end part of current collecting pin 34 can be in contact with the side surface of outer can 12 while substrate 31 is in contact with the upper surface of each battery cell case 14. The length of current collecting pin 34 is, for example, 3% to 20% of a length of cylindrical battery cells 11 in the axial direction and is preferably 5% to 15%. If the length of current collecting pin 34 is within such ranges, current collecting pin 34 can be attached easily, and good electrical connection can be secured.

Current collecting pin 34 only needs to have such a shape that current collecting pin 34 comes into strong contact with the side surface of outer can 12 to achieve good electrical connection with outer can 12. Current collecting pin 34 has a spring structure that can be elastically deformed in a direction perpendicular to a length direction of current collecting pin 34 (hereinafter, the direction is referred to as lateral direction in some cases), for example. In the present exemplary embodiment, three substantially flat plates each having a rectangular shape and protruding from substrate 31 are arranged in a triangular prism shape to form current collecting pin 34 having a spring structure. In this case, current collecting pin 34 shrinks in the lateral direction so that the pin can be inserted into a gap between cylindrical battery cells 11 even when the gap is smaller than a lateral length of current collecting pin 34. Since current collecting pin 34 inserted into the gap will attempt to laterally expand, and pressing force (biasing force) thus acts in the direction toward the side surface of outer can 12. For example, a structure like a banana plug can be applied to current collecting pin 34.

Figure 3:
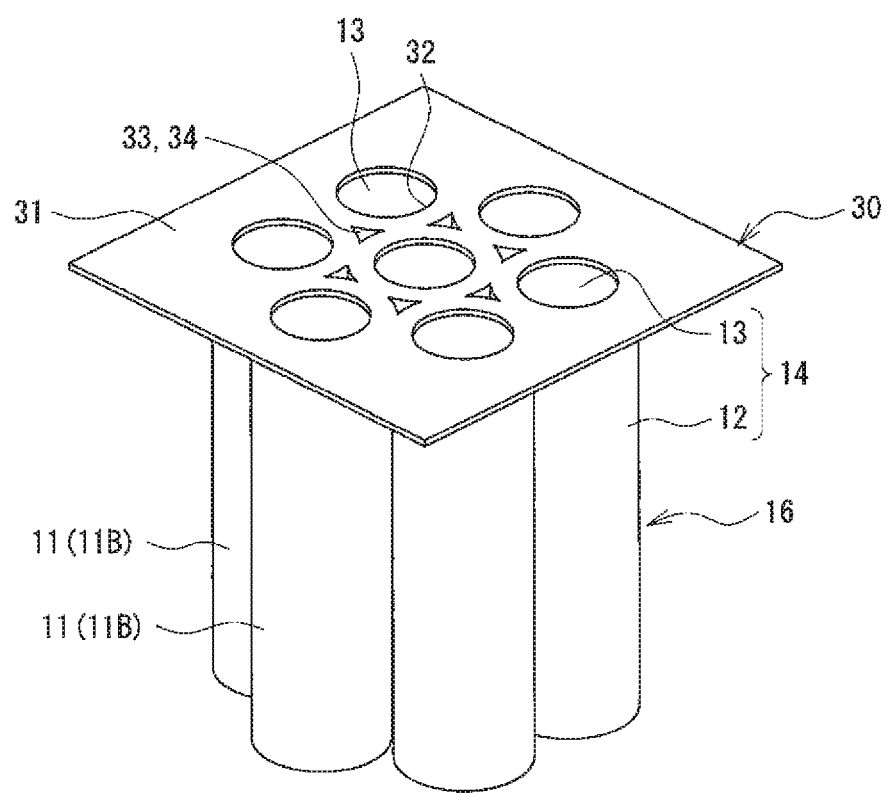
FIG. 3 is a perspective view showing how the negative current collector of an example of the exemplary embodiment is attached to a cell group.

As illustrated in FIG. 3, substrate 31 has pin insertion holes 33 through which current collecting pins 34 are inserted. Each pin insertion hole 33 is a through hole having such dimensions and shape that current collecting pin 34 can be inserted through the through hole, and pin insertion holes 33 of the same number as current collecting pins 34 are formed. In the example shown in FIG. 3, six pin insertion holes 33 are substantially equidistantly formed on the same circumference on a surrounding area of opening part 32 through which sealing body 13 of first battery cell 11A is exposed. Current collecting pins 34 are attached to substrate 31 while being inserted into pin insertion holes 33 formed in substrate 31. Current collecting pins 34 may be, for example, pressed into pin insertion holes 33 and are fixed on substrate 31 by being engaged to circumferential edges of pin insertion holes 33.

Figure 4:
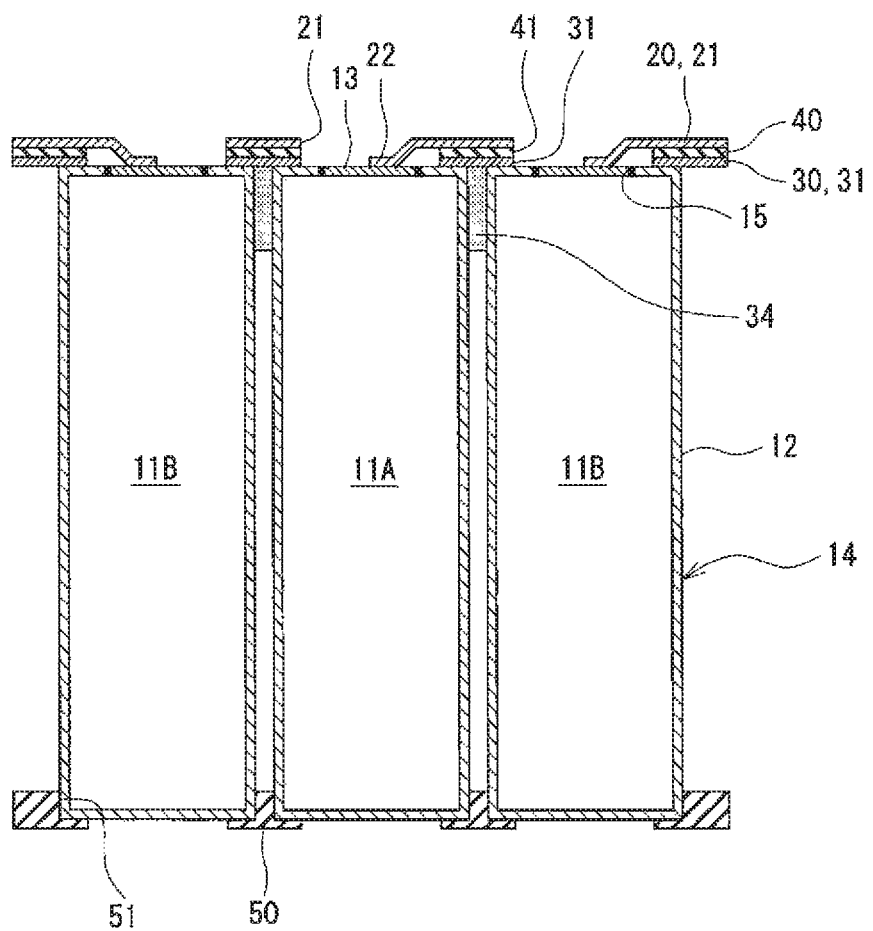
FIG. 4 is a cross-sectional view along line IV-IV in FIG. 1.
Figure 5:
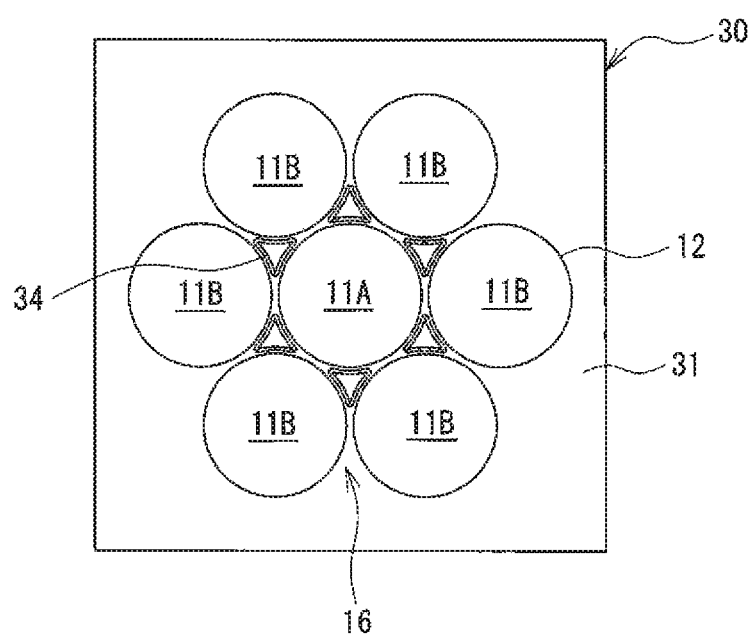
FIG. 5 is a bottom surface view showing how the negative current collector as an example of the exemplary embodiment is attached to the cell group.

As illustrated in FIGS. 4 and 5, the plurality of current collecting pins 34 are provided on the same circumference in the surrounding area of first battery cell 11A. In more detail, current collecting pins 34 are preferably disposed such that a central axis of each current collecting pin 34 is located substantially on the same circumference centering the central axis of first battery cell 11A. In other words, the plurality of current collecting pins 34 are provided on the same circumference in a surrounding area of at least one opening part 32. In the present exemplary embodiment, in the surrounding area of opening part 32 through which sealing body 13 of first battery cell 11A is exposed, six current collecting pins 34 are substantially equidistantly provided on the same circumference whose circle center is a center of such opening part 32.

The plurality of current collecting pins 34 may have shapes and dimensions different from each other, but the shapes and dimensions are preferably identical to each other. It is preferable that current collecting pins 34 be pressed, with equal force, against the side surfaces of all outer cans 12 electrically connected to current collecting pins 34. Note that a conductive material such as a conductive adhesive may be provided on current collecting pins 34 or on parts of the side surfaces of outer cans 12 with which current collecting pins 34 come into contact.

In the present exemplary embodiment, each current collecting pin 34 is inserted into the gap between three neighboring cylindrical battery cells 11 and presses the side surfaces of outer cans 12 of such three neighboring battery cells. Cell module 10 has six gaps around first battery cell 11A surrounded by six second battery cells 11B, and each of the six gaps is surrounded by three cylindrical battery cells 11 (first battery cell 11A and two second battery cells 11B. Six current collecting pins 34 are each inserted into each of the six gaps, and each current collecting pin 34 is in contact with totally three side surfaces of outer cans 12 of first battery cell 11A and two second battery cells 11B. Each current collecting pin 34 is preferably pressed against the side surfaces of three outer cans 12 with equal force.

Figure 6:
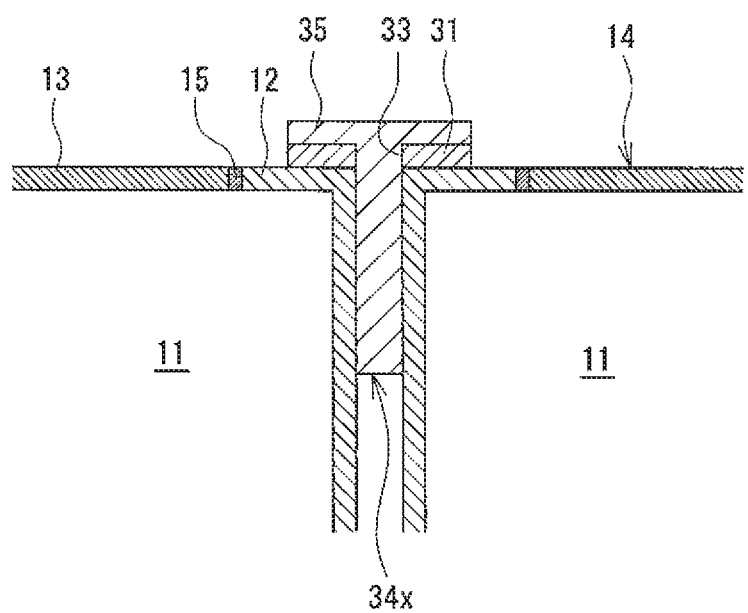
FIG. 6 is a diagram showing a modified example of a negative pin.

FIG. 6 is a cross-sectional view showing current collecting pin 34x of another example of the current collecting pin. On current collecting pin 34x illustrated in FIG. 6, overhang part 35 that is larger than pin insertion hole 33 is formed on an upper end part of the pin. Since overhang part 35 is provided, overhang part 35 is caught on the upper surface of substrate 31 when current collecting pin 34x is inserted into pin insertion hole 33, and current collecting pin 34x is surely prevented from falling off. Note that overhang part 35 may be provided with a claw that bites into substrate 31. Further, overhang part 35 may be formed to cover other current collecting pins 34x, and the plurality of current collecting pins 34x may be coupled to each other.

Cell module 10 including the above-described configuration makes it possible to establish an electrical connection structure between the battery cells by such a simple method that inserting current collecting pins 34, 34x are inserted into the gaps between cylindrical battery cells 11. Further, since current collecting pins 34, 34x are in strong contact with and press the side surfaces of outer cans 12 functioning as outer terminals, good electrical connection between the battery cells are secured. Negative current collectors 30 do not need to be welded, and the gaps between cylindrical battery cells 11 can therefore be made small.

Figure 7:
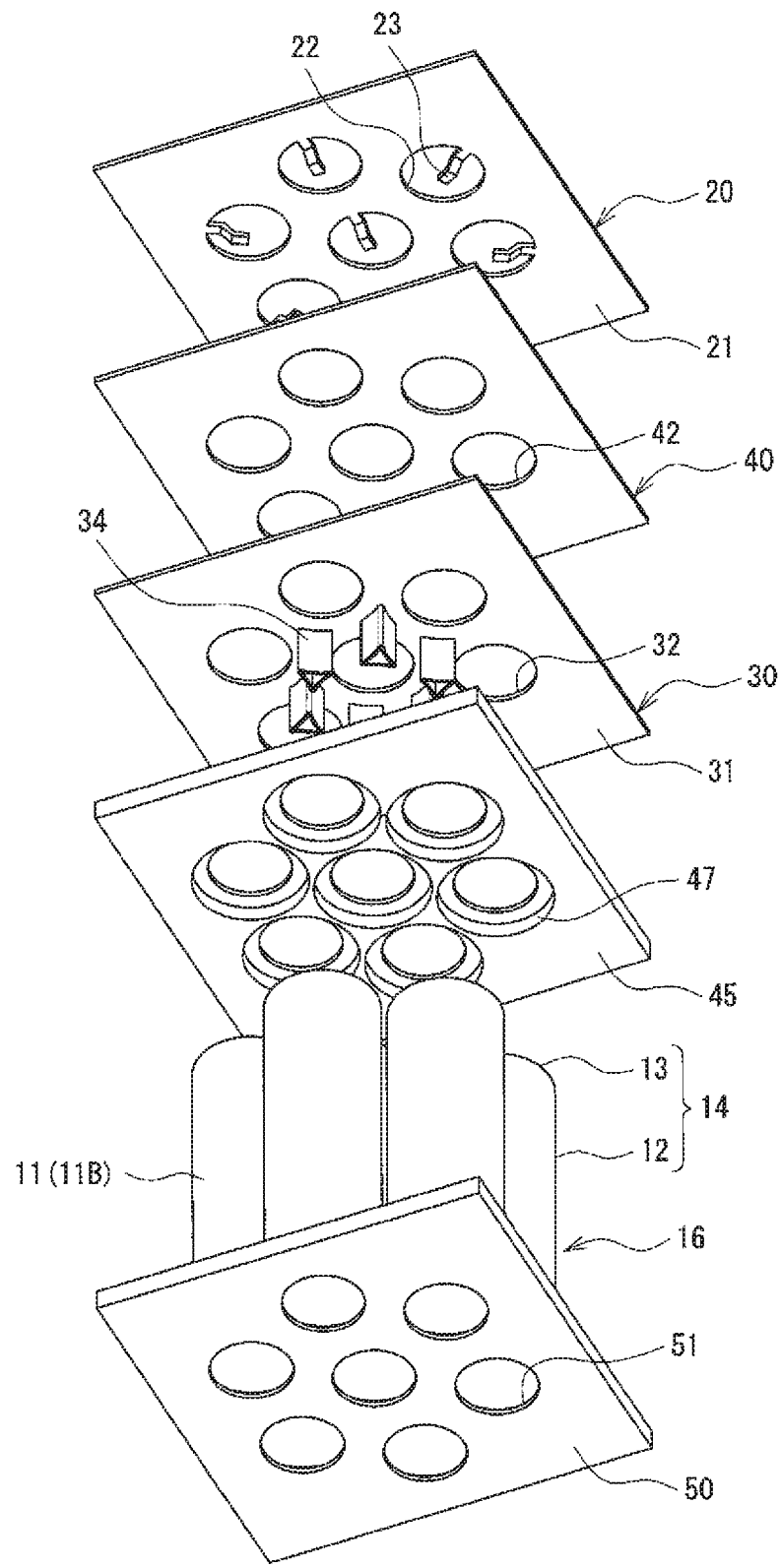
FIG. 7 is an exploded perspective view of a cell module as another example of the exemplary embodiment.

Note that, as illustrated in FIG. 7, insulating plate 45 may be provided between battery cell group 16 and negative current collector 30. Insulating plate 45 has a function to prevent contact between the positive outer terminals of cylindrical battery cells 11 and negative current collector 30. Insulating plate 45 is used if, for example, approximately the whole of the upper surface of each battery cell case 14 is a positive outer terminal (sealing body 13). Insulating plate 45 has opening parts 47 through which respective sealing body 13 are exposed. In the example shown in FIG. 7, opening parts 47 are configured such that a diameter of each opening part 47 is smaller than a diameter of each cylindrical battery cell 11 and such that a peripheral edge part of each opening part 47 covers a peripheral edge part of the upper surface of each cylindrical battery cell 11. For example, the upper end part of each cylindrical battery cell 11 is inserted into each opening part 47, and insulating plate 45 functions also as a holder.

The invention claimed is:

1. A cell module comprising:
   a battery cell group including a plurality of cylindrical battery cells, each of the cylindrical battery cells including: an outer can that has a bottomed cylindrical shape; and a sealing body that seals an opening of the outer can, such that the plurality of cylindrical battery cells are disposed with the sealing bodies directed in a same direction;
   a first current collector electrically connected to each of the sealing bodies functioning as first outer terminals of the plurality of cylindrical battery cells; and
   a second current collector electrically connected to each of the outer cans functioning as second outer terminals of the plurality of cylindrical battery cells,
   wherein the second current collector has:
      a substrate disposed on a side of the sealing bodies to cover the battery cell group; and
      at least one current collecting pin protruding in a direction toward the battery cell group from the substrate, and
   the at least one current collecting pin is inserted into a gap between three cylindrical battery cells of the plurality of cylindrical battery cells neighboring each other in an axial direction of the plurality of cylindrical battery cells and presses side surfaces of the outer cans of the three cylindrical battery cells.

2. The cell module according to claim 1, wherein
   the plurality of cylindrical battery cells includes:
      at least one first battery cell; and
      a plurality of second battery cells disposed on a same circumference in a surrounding area of the first battery cell, and
   a plurality of the current collecting pins are provided on a same circumference in a surrounding area of the first battery cell.

3. The cell module according to claim 1, wherein
   the substrate includes a plurality of opening parts through each of which the sealing body of each of the plurality of cylindrical battery cells is exposed, and a plurality of the current collecting pins are provided on a same circumference in a surrounding area of at least one of the opening parts.

4. The cell module according to claim 1, wherein the substrate includes at least one pin insertion hole that the current collecting pin is inserted through.

5. The cell module according to claim 1, wherein the first current collector is stacked over a surface of the second current collector opposite to the battery cell group with an insulating plate disposed between the first current collector and the second current collector.

\* \* \* \* \*